Figure 1:
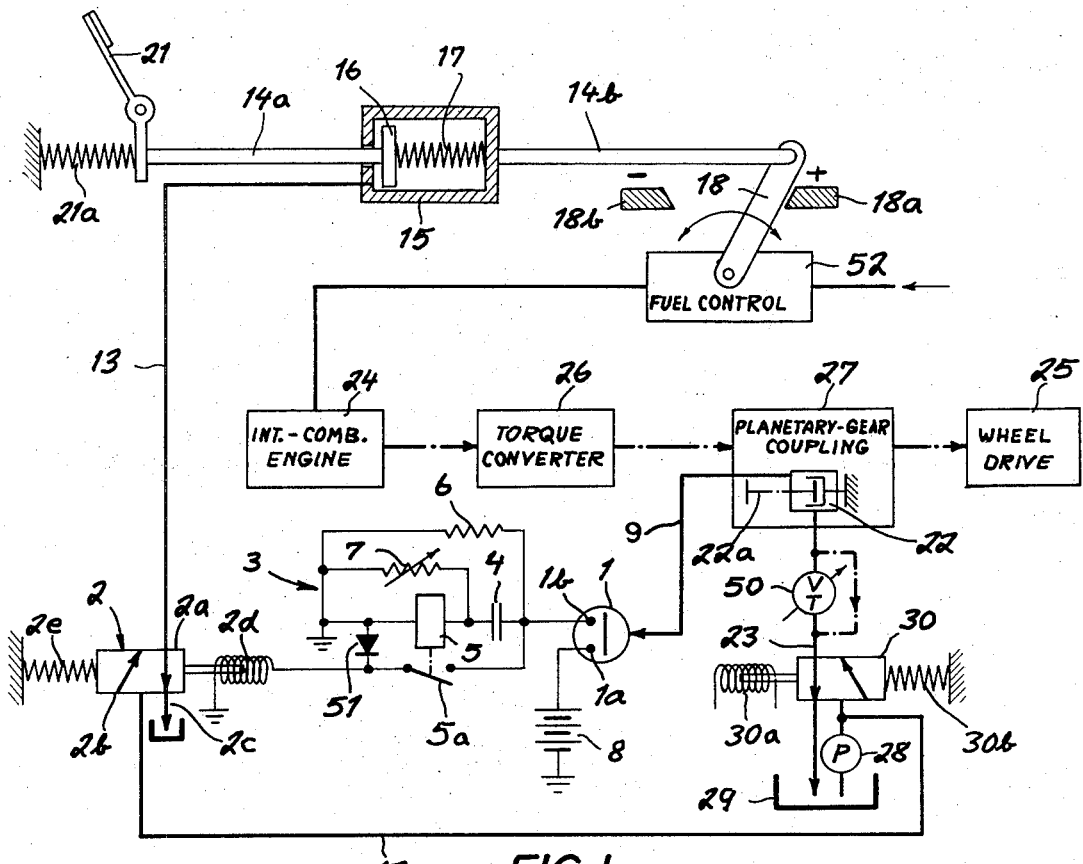

United States Patent

Podssuweit et al.

[11] 3,814,224
[45] June 4, 1974

[54] FUEL-SUPPLY CONTROL FOR AUTOMOTIVE TRANSMISSIONS AND THE LIKE

[75] Inventors: Klaus Podssuweit, Friedrichshafen; Winfried Felder, Aulendorf, both of Germany

[73] Assignee: Zahnradfabrik Friedrichshafen Aktiengesellschaft, Friedrichshafen, Germany

[22] Filed: Sept. 2, 1971

[21] Appl. No.: 177,320

[30] Foreign Application Priority Data
Sept. 19, 1970 Germany............................ 2046381

[52] U.S. Cl................................ 192/.084, 74/858
[51] Int. Cl.......................................... B60k 21/00
[58] Field of Search............ 192/.084; 74/858, 873, 74/859, 872

[56] References Cited
UNITED STATES PATENTS
2,414,717  1/1947  Chapman.......................... 192/.084
2,673,474  3/1954  Boyce................................. 74/858
3,105,578  10/1963  Meyer............................... 192/.084
3,204,719  9/1965  Grozinger....................... 74/873 X
3,269,206  9/1966  Carr............................. 192/.084 X Primary Examiner—Benjamin W. Wyche
Attorney, Agent, or Firm—Karl F. Ross; Herbert Dubno

[57] ABSTRACT

A drive-establishing clutch or brake of an automotive power train, actuated hydraulically upon a shifting into gear, is connected to a pressure-responsive switch which, upon attainment of a predetermined degree of hydraulic loading, closes a circuit for temporarily restricting the fuel supply to a carburetor or injection nozzle. The throttling of the fuel supply is terminated either after a predetermined period, as measured by a time-constant network, or upon full activation of the clutch or brake, as determined by a speed detector.

7 Claims, 2 Drawing Figures

PATENTED JUN 4 1974 3,814,224

Klaus Podssuweit
Winfried Felder
INVENTORS.

BY

Karl F. Ross
Attorney

FUEL-SUPPLY CONTROL FOR AUTOMOTIVE TRANSMISSIONS AND THE LIKE

Our present invention relates to a system for controlling the fuel supply of an internal-combustion engine driving an automotive vehicle or a similar load through a power train including means, such as planetary-gear coupling, for establishing different speed ratios by the actuation of one or more hydraulic brakes or clutches.

Such hydraulically operated clutches or brakes, which in this context have come to be referred to in the art as drive-establishing means, are actuated gradually with a progressive buildup of fluid pressure to insure a smooth transition from the disengaged to the engaged state of their laminae. During the transition period, the relative motion of the contacting laminae generates appreciable heat in a quantity depending upon the torque to be transmitted or absorbed. This torque, in turn, is a function of the rate of fuel flow to the engine, at the instant of shifting, which in the case of an automotive vehicle is generally controlled by a driver-operated element such as an accelerator pedal.

Since the driver cannot be expected to throttle the fuel supply during every gear change, particularly in the case of an automatic transmission where such changes occur frequently without the conscious participation of the driver, our invention aims at providing means for automatically modifying (e.g., reducing) the fuel-supply rate for a short period at the instant of shifting, independently of the position of the accelerator pedal or equivalent operating element.

This object is realized, in accordance with our invention, by the provision of a pressure-sensitive switch coupled to the drive-establishing means (clutch or brake) to be actuated, in order to determine the degree of loading thereof by the selectively admitted hydraulic fluid; whenever this degree of loading reaches a predetermined level, the pressure-sensitive switch completes a circuit for controlling the position of a throttle valve, an injection regulator or equivalent means for adjusting the rate of fuel flow to the engine.

According to a more specific feature of our invention, the controller for the rate-adjusting mechanism is inserted in a linkage connecting that mechanism with the accelerator pedal or other operating element. This controller has two relatively movable parts, such as the piston and the cylinder of a hydraulic jack or the winding and the core of a solenoid, adapted to change the effective length of that linkage upon closure of its operating circuit by the switch sensing the internal hydraulic pressure of the associated clutch or brake.

In order to restore the rate-adjusting mechanism to the control of the accelerator pedal, the hydraulic jack, solenoid or the like may be deactivated independently of the pressure-sensitive switch after a certain period established by a timing circuit or by a device ascertaining the full engagement of the actuated clutch or brake. Such a device may comprise a speed detector which, in the case of a clutch, ascertains the substantial equality of the rotary speeds of the input and output shafts thereof with the aid of two signal generators whose outputs are fed to a comparator. If the monitored drive-establishing means is a brake instead of a clutch, the speed detector may simply determine the substantially complete deceleration of the brake shaft in order to restore the fuel-rate controller to normal.

The invention will be described in greater detail hereinafter with reference to the accompanying drawing in which:

FIG. 1 diagrammatically illustrates a first embodiment; and

Figure 2:
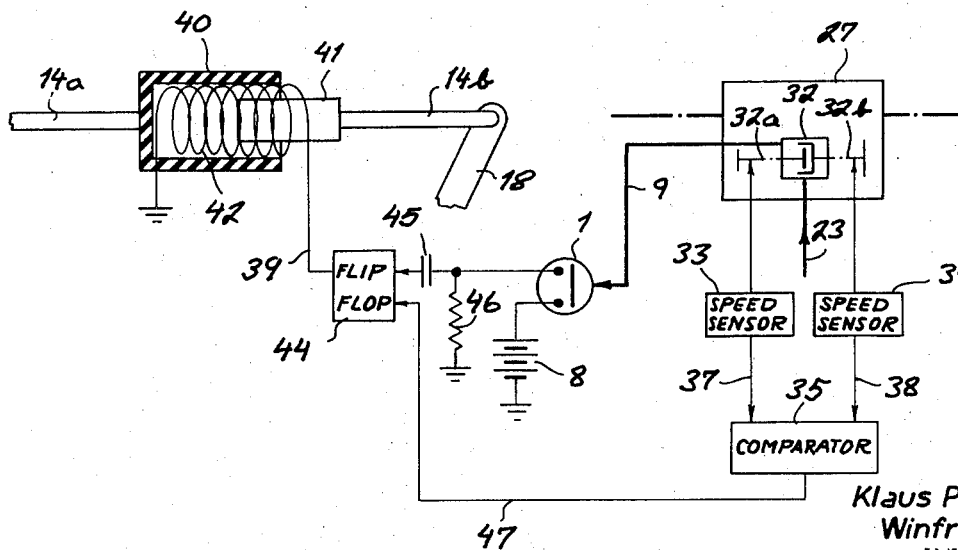

FIG. 2 is a similar diagram showing part of a second embodiment.

In FIG. 1 we have illustrated as much of a conventional automotive transmission system as is necessary for an understanding of the present invention. An internal-combustion engine 24 drives the traction wheels 25 of a vehicle through a torque converter 26 and a planetary-gear coupling 27. Different speed ratios can be established, as is well known per se, by the selective actuation of several drive-establishing means in gear coupling 27 such as a brake 22 adapted to arrest a shaft 22a.

A pump 28 continuously delivers oil from a sump 29 to a system of hydraulic conduits by way of a set of valves conventionally operated in response to such parameters as engine load and speed. One of these valves, shown at 30, is controlled by a solenoid 30a in a circuit not further illustrated and is normally biased by a spring 30b into a position in which the interior of brake 22 is drained through a conduit 23 to sump 29. The rate of admission of the oil to the brake 22, in an alternate position of valve 30, is restricted by a throttle valve 50 to an extent determined by some of these external parameters in order to afford a gradual, low-impact shifting into gear; throttle valve 50 may be bypassed, as indicated in dot-dash lines, for the draining of the brake housing upon restoration of solenoid valve 30 to normal. Reference in this connection may be made to commonly owned application Ser. No. 176,180 filed by Winfried Felder and Walter Kuhn on 30 Aug. 1971, disclosing a system wherein the variable hydraulic pressure is replaced by constant pressure a predetermined time after the shifting operation. In the present system, the shifting from one speed ratio to the other with energization of the solenoid 30a may be carried out either manually or automatically.

Another fluid line 9 leads from the housing of brake 22 to a pressure-sensitive switch 1 which normally open-circuits a pair of contacts 1a, 1b. Line 9 may be separated by an elastic diaphragm (not shown) from the main fluid space of brake 22 as is customary in the case of such pressure sensors. Contact 1a is connected to the ungrounded terminal of a source of direct current 8, such as the usual car battery, whereas contact 1b is grounded through a resistor 6 forming part of a time-constant network 3 which also includes a variable resistor 7 and a capacitor 4. Resistor 7 shunts the winding of a relay 5 inserted between contact 1b and ground in series with capacitor 4; upon energization of that winding, an armature 5a of relay 5 closes a circuit from contact 1b through the winding of a solenoid 2d controlling a hydraulic valve 2. A diode 51 shorts out transients developed in solenoid coil 2d upon the reopening of that circuit.

Valve 2, biased by a spring 2e, normally has a section 2a aligned with a conduit 13 which is thereby connected with a drain 2c. A high-pressure conduit 12, supplied by pump 28, is connectable with line 13 via a valve section 2b upon the energization of solenoid 2d. Fluid line 13 terminates at the housing of a hydraulic jack 15 provided with a piston 16 loaded by a compression spring 17. Piston 16 has a rod 14a articulated to an accelerator pedal 21, which is under tension of a spring 21a, whereas housing 15 is rigid with another rod 14b hinged to a lever 18 which is movable between two fixed stops 18a, 18b to vary, via a control mechanism 52, the rate of fuel flow to engine 24. Rate-control mechanism 52 may comprise the usual butterfly valve in the air-intake duct of a gasoline engine or a dosing device for an injector of a Diesel engine. In either case, a movement of rate-adjusting lever 18 toward stop 18a increases the fuel supply whereas a movement toward stop 18 b reduces it.

In operation, energization of solenoid 30a to shift the valve 30 unblocks the path from pump 28 to brake 22 whereby the latter is progressively loaded with hydraulic fluid. When the internal pressure of the brake housing reaches a predetermined level, switch 1 responds and bridges its contacts 1a, 1b whereby a voltage surge traverses the capacitor 4 and temporarily energizes the relay 5. The latter, in attracting its armature 5a, completes the energizing circuit for solenoid 2d whereby valve 2 is shifted to admit oil from conduit 12 to jack 15. This operation, which represses the piston 16 against the force of its spring 17, effectively shortens the linkage 14a, 14b whereby lever 18 is drawn toward its stop 18b if it had previously been positioned at or close to the stop 18a. The resulting reduction of the fuel supply to engine 24 lowers the torque of shaft 22a to be absorbed by brake 22. This rate reduction persists for a period determined by the time constant of network 3 which may be varied with the aid of adjustable resistor 7 and which ends as soon as condenser 4 is sufficiently discharged by way of that resistor to release the armature 5a of relay 5. Spring 2e thereupon restores valve 2 to normal, allowing spring 17 to re-expand so that linkage 14a, 14b regains its normal length as the jack is drained through conduits 13 and 2c.

In FIG. 2 we have shown a partial modification of the system of FIG. 1, with omission of some of the components described above. Brake 22 of planetary-gear coupling 27 has been replaced by a clutch 32 provided with an input shaft 32a and an output shaft 32b. These two shafts are coupled to respective speed sensors 33 and 34 which generate signal voltages proportional to their rotary speeds on a pair of conductors 37, 38 terminating at respective inputs of a comparator 35.

In this embodiment, linkage 14a, 14b includes a solenoid 40 whose body, rigid with rod 14a, is integral with a coil 42 while its core 41 forms an extension of rod 14b. Energization of solenoid coil 42, therefore, effectively foreshortens the linkage 14a, 14b in the same manner as actuation of jack 15 in the preceding embodiment. The energizing circuit of solenoid 40 includes a flip-flop 44 with an output connected to coil 42 by way of a lead 39, the flip-flop being settable via a coupling condenser 45 by the voltage drop developing across a resistor 46 upon closure of pressure-sensitive switch 1. Comparator 35, upon ascertaining a substantial equality between the outputs of signal generators 33, 34 and therefore between the speeds of shafts 32a, 32b, resets the flip-flop 44 by way of a lead 47, thereby de-energizing the coil 42.

The operation of the system of FIG. 2 is thus analogous to that of the first embodiment, except that the solenoid 40 is deactivated upon completion of the engagement of clutch 32 (as determined by speed detector 33 – 35) whereas the hydraulic controller 15 of FIG. 1 is restored after a predetermined, albeit adjustable, period.

Naturally, the system of FIG. 1 could also be used for a clutch 32 of FIG. 2; conversely, the jack 15 could be substituted for the solenoid 40 with connection of lead 39 to the solenoid coil 2d of valve 2.

If the clutch 32 in FIG. 2 were replaced by the brake 22 of FIG. 1, comparator 35 and sensor 34 would be omitted; sensor 33, coupled to shaft 22a, would then directly reset the flip-flop 44 (e.g., by way of an inverter) whenever its output indicates substantial standstill of that shaft.

We claim:

1. In a transmission system including a power train with hydraulically actuatable drive-establishing means for changing the speed ratio between an internal-combustion engine and a load interconnected by said power train, valve means for selectively admitting hydraulic fluid to said drive-establishing means, and fuel-supply means for said engine provided with rate-adjusting means, the combination therewith of:

pressure-sensitive means coupled to said drive-establishing means and responsive to the degree of loading thereof by said hydraulic fluid;

an operating element for said rate-adjusting means;

a mechanical linkage connecting said rate-adjusting means with said operating element;

control means inserted in said linkage for displacing said rate-adjusting means independently of said operating element by altering the effective length of said linkage; and circuit means coupled to said pressure-sensitive means and to said control means for activating the latter to reduce the rate of fuel supply to said engine upon said degree of loading reaching a predetermined level, said circuit means including restoring means effective after a delay following such activation to deactivate said control means independently of said pressure-sensitive means, thereby re-establishing the original effective length of said linkage.

2. The combination defined in claim 1 wherein said control means comprises a hydraulic jack.

3. The combination defined in claim 1 wherein said control means comprises a solenoid.

4. The combination defined in claim 1 wherein said restoring means includes a time-constant network.

5. The combination defined in claim 4 wherein said circuit means includes a relay connected to be energized for a predetermined period measured by said network.

6. The combination defined in claim 1 wherein said restoring means includes a speed detector connected to a portion of said power train coupled to said drive-establishing means.

7. The combination defined in claim 6 wherein said drive-establishing means is a clutch with input and output shafts, said speed detector comprising a paid of signal generators respectively coupled to said shafts and a comparator connected to said signal generators for deactivating said control means in response to substantial equality of the generator outputs.

* * * * *